March 15, 1949.    J. HILLIER ET AL    2,464,396
ART OF FOCUSING ELECTRON MICROSCOPES, ETC.
Filed Jan. 30, 1948
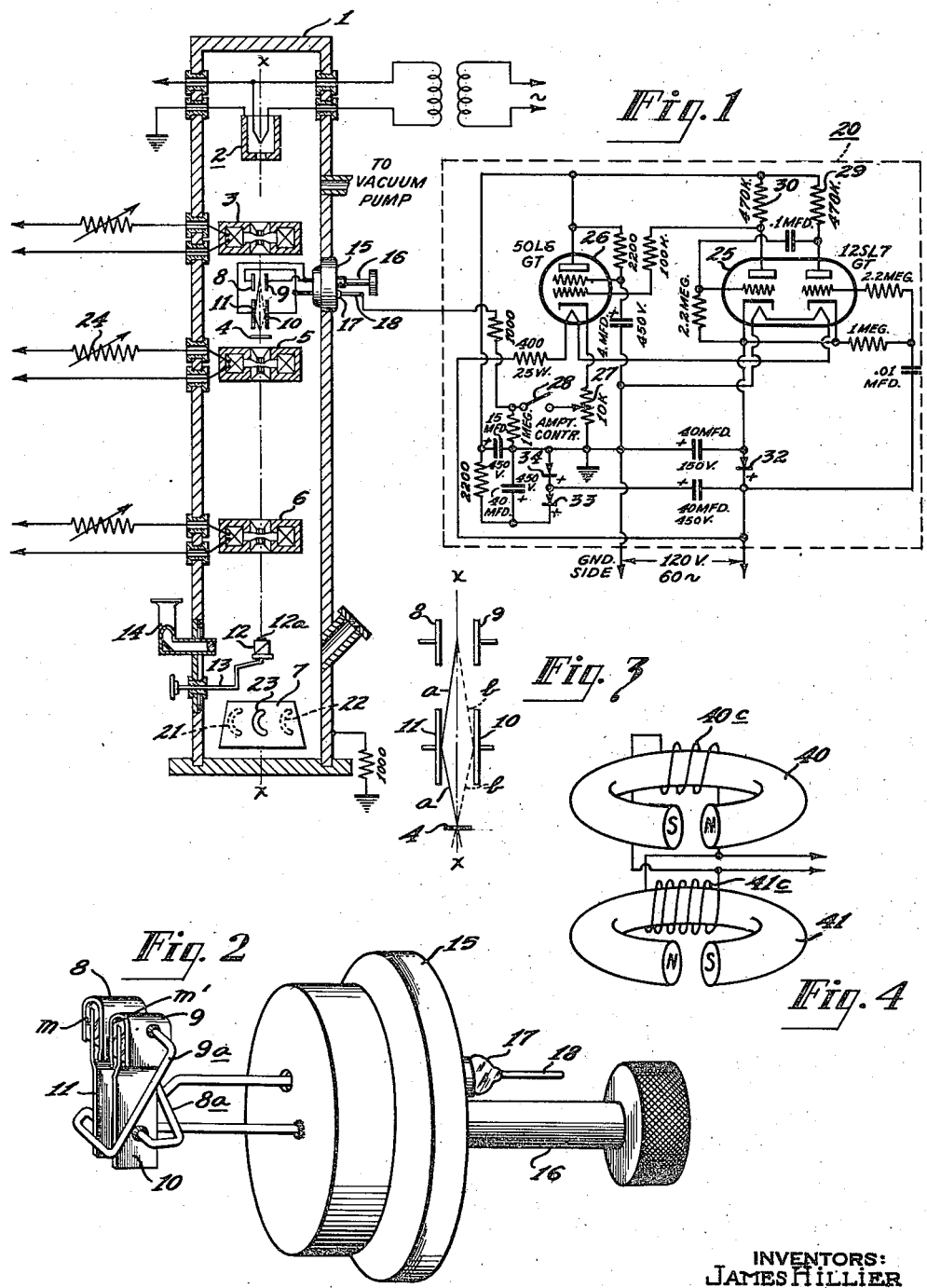
INVENTORS:
JAMES HILLIER
SIDNEY G. ELLIS
ATTORNEY Patented Mar. 15, 1949

2,464,396

UNITED STATES PATENT OFFICE 2,464,396

ART OF FOCUSING ELECTRON MICROSCOPES, ETC.

James Hillier, Cranbury, and Sidney G. Ellis, Princeton, N. J., assignors to Radio Corporation of America, a corporation of Delaware Application January 30, 1948, Serial No. 5,466

8 Claims. (Cl. 250—49.5)

This invention relates to electron-optical instruments and has for its principal object to provide an improved method of and apparatus for ascertaining and adjusting the focus of electron-microscopes of the magnetic or electrostatic types wherein electrons travel from a source through a beam-forming field to a specimen and thence through an objective lens field to a viewing screen.

In the normal operation of an electron microscope, the highest resolving power and contrast in the image are obtained when the angular aperture of the electron beam irradiating the specimen is kept at a minimum. Unfortunately it is not possible to reduce indefinitely this angular aperture because the intensity of the image is inherently related to this angular aperture by an expression of the form:

$$I_i = K\alpha^2$$

where I is the intensity of the image, K is a constant instrumental factor dependent upon the magnification of the microscope and of the structure of the electron gun system, alpha is the angular aperture and the depth of field of an electron microscope, from the point of view of geometric optics, is also dependent upon the angular aperture of the illumination according to the following expression:

$$P = \frac{2d}{\alpha}$$

where P represents depth of field and $d$ is the desired resolving power of the system. In the normal operation of an electron microscope, it has been customary to observe and focus the image with the angular aperture of the illumination made as large as possible so that the intensity is a maximum and the depth of field is very shallow. Now, if after the adjustment has been made the angular aperture of illumination is greatly reduced, the depth of field is correspondingly increased, which takes care of any errors which may have been made in the original focusing and overcomes the difficulty of observing the image at low intensities.

Unfortunately, this method of adjusting electron microscopes is not too satisfactory owing to the technical necessity of using electron optical magnifications which are as much as an order of magnitude below the useful limit of the instrument. For instance, consider an instrument which is capable of resolving 20 Å. in which the visually observed image is at a magnification of 10,000. In this image a 20 Å. separation will appear as a separation of 0.02 mm. However, the resolving power of the unaided eye is only 0.2 mm. and hence the depth of field of the instrument for visual observation will appear to be 10× as great as that for photographic recording of the image. Theoretically, this should be overcome by the method of focusing the instrument visually with high angular aperture, and then reducing the angular aperture by a factor of 10 before making the photographic record. This increases the photographic depth of field by a factor of 10 so that it, in fact, coincides with the visual depth of field. This would be satisfactory if it were not for the fact that the focus of an electron microscope objective is not independent of intensity. Instead, it depends on the charge distribution and space charge at the specimen; both of which are varied when the angular aperture is changed. In addition there is, in most instruments, an interaction between the fields of the condenser and objective lenses. Hence, with this method of focusing, it has usually been necessary to make focal series which cover the range of the change of focus with intensity.

For the case of thick specimens, still another difficulty is encountered. The electron scattering which takes place in the thick region of the specimen may be sufficient to increase the angular aperture of the pencil entering the objective by as much as an order of magnitude over that of the incident pencil. If this is true, changing the angular aperture of the incident pencil has no effect on the depth of field of the lens for this particular part of the specimen and hence, the visual focusing can be quite inaccurate.

To overcome this difficulty, a microscope system providing approximately 10× enlargements of the visual image without loss in intensity was developed. It is capable of resolving approximately 40 Å. when the instrumental magnification is set at 10,000. Theoretically on the basis of geometrical optics, this system should make it possible to obtain perfect focus on all images. Actually, however, this was not the case because for very high resolving powers, the wave nature of the electrons and the resulting diffraction at the specimen must be taken into account. It then appears that the depth of field does not increase indefinitely as the angular aperture of illumination is decreased but instead has a finite value for a very small illuminating aperture. The resulting difficulty in focusing the instrument accurately can be overcome by the operator becoming familiar with the changes which the diffraction fringes at the image of a discontinuity in the specimen undergo as the focal length of the objective is changed. With a little experience it is possible to interpolate the focusing adjustment so that quite accurately focused images are recorded. This method has some disadvantages in that it requires considerable practice and skill on the part of the operator. Even then it is not successful if the specimen field being examined does not have a discontinuity of sufficiently high contrast for the diffraction fringes to be visible.

In an effort to overcome the foregoing objections to prior art methods of focusing electron microscopes of the "transmission type," J. B. Le Poole of Delft University has proposed (see Philips' Technical Review, vol. 9, 1947, pp. 33–45) a method which depends, fundamentally, upon increasing the angular aperture of illumination without introducing changes in the intensity of the irradiation of the specimen or the charge distribution on it. This was accomplished by deflecting the illuminating beam through a relatively large angle above the specimen without changing the area of the specimen that is illuminated. Le Poole states:

"By means of the electric field between two sets of parallel plates situated between the condenser and the objective lens, the incident ray is caused to oscillate back and forth at a frequency of 50 c./sec. The focusing arrangement is so constructed that the incident beam oscillates over an angle of $1/100$ radian."

From this description one assumes that Le Poole passed the beam through two sets of deflecting plates which are parallel but which are connected so as to deflect the beam in opposite directions when a simple sine wave potential is applied to the said plates.

It can be shown theoretically that when Le Poole's system is properly adjusted the angle of incidence of the beam is in no way dependent on the adjustment of the condenser lens and, as can be expected from its principle of operation, it is possible to make the adjustment of focus very critical when the parts of the specimen under examination exhibit high contrast. However, in applying Le Poole's method to the examination of organic and other specimens of low contrast it is often not possible to "find" the focused image or, stated another way, to determine when exact focus has been achieved. Why this is so will be apparent when it is appreciated that during the period that the sinusoidal beam deflecting potential is applied to the instrument one observes a diffused (i. e. "blurred") image of the specimen upon the viewing screen and a clear image is not achieved until the instrument is in exact focus.

The foregoing objections to Le Poole's focusing method are obviated in accordance with the present invention by replacing the sinusoidal beam-deflecting potential by a square wave or other properly pulsed potential. With the deflecting plates thus alternately energized the specimen is illuminated from but two directions and the out-of-focus image appears upon the fluorescent screen as two identical, displaced, images. The focusing operation of the present invention involves the adjustment of the intensity of the field of the objective lens to that value at which the two displaced images are brought into register with each other and exactly coincide. Even in the out-of-focus condition the separate displaced images are quite clear. Thus it is possible to estimate the amount the instrument is out-of-focus and even the slightest movement of the controls indicates which direction it must be adjusted in order to achieve focus.

The invention will be further described in connection with the accompanying drawing wherein:

Fig. 1 is a schematic view of an electron microscope including a beam-deflecting electrostatic electrode assembly and a square wave generator for said assembly, as well as certain other auxiliary apparatus employed in carrying the present invention into effect, Fig. 2 is a view in perspective showing details of a beam-deflecting electrostatic electrode assembly constructed in accordance with the present invention, Fig. 3 is an enlarged view of the electrode assembly of Fig. 1 showing the discrete paths along which the electrons travel during the focusing operation and Fig. 4 is a view in perspective of an alternative, magnetic-type, beam-deflecting assembly for use in the practice of the invention.

In Fig. 1 of the drawing there is shown a transmission type electron microscope comprising an evacuable casing 1 having a central electron optical axis $x-x$ along which electrons travel from a source, exemplified by an electron gun 2 and a beam-forming condenser lens 3, to a transparent specimen 4 and thence through an objective lens 5 and a projection lens 6 to a fluorescent screen 7. In accordance with the present invention the microscope is also provided with two pairs of deflecting plates 8—9, 10—11, in the space between the condenser lens 3 and specimen 4 and, preferably, but not necessarily, with an auxiliary viewing screen in the form of a prism 12 between the projection lens 6 and the main screen 7. This prism 12 is coated on its top surface with a fluorescent material 12a and is mounted on a movable bracket 13 so that it may be swung out of the way of the beam when the focus of the microscope has been adjusted. An optical microscope 14 in the wall of the casing 1 permits close observation of the auxiliary screen 12 during the focusing operation and thus ensures great exactness of focus.

The deflecting electrodes 8 to 11 inclusive, shown in Figs. 1 and 2, are of the capacitive or electrostatic type and are shown supported upon a removable door or "plug" 15 which is normally held in a port in the wall of the casing 1 by atmospheric pressure. A handle 16 on the "plug" facilitates the removal of the entire assembly for purposes of cleaning or aligning the electrodes. It will be observed upon inspection of both Figs. 1 and 2 that one electrode of each pair is connected to the other electrode of the other pair. Thus, the upper left electrode 8 of the pair 8—9 is connected by a lead 8a to the lower right electrode 10 of the lower pair 10—11, and the upper right electrode 9 is connected by a lead 9a to the lower left electrode 11. In order to avoid the necessity for a multiplicity of electrical connections the electrodes 9 and 11 are grounded to the casing 1 through the "plug" 15. The other two deflecting electrodes 8 and 10, are insulated from ground by a Kovar-glass bushing 17 through which a single lead 18 extends. It will also be observed upon inspection of Figs. 1 and 2 that the lower pair, 10 and 11, of focusing electrodes extend along the electron axis $x-x$ substantially twice as far as the upper pair 8—9. This relative difference in size of the upper and lower pairs of electrodes has been found useful in directing the electrons in the paths ($a$ and $b$) which are later described. Undesired vibration of the deflecting-electrode assembly is minimized when the electrodes 8 and 11 and 9 and 10 are mounted in overlapping relation (as shown in Fig. 2) with the overlapping portions insulated from each other by mica inserts $m$, $m'$ respectively. In any event it will be understood that the facing surfaces of the electrodes 8, 11 and 9, 10 should preferably lie in spaced parallel planes on opposite sides of the electron-optical axis $x$—$x$ of the instrument.

In carrying the focusing method of the present invention into effect the even numbered (8 and 10) and the odd numbered (9 and 11) focusing electrodes are alternately and repeatedly energized by discrete voltages which may be supplied thereto, for example, by a "square-wave" generator 20 (later described). Thus, the electrons in traveling between the condenser lens 3 and the specimen 4 are directed, alternately, in spaced apart paths $a$ and $b$ (see Fig. 3) which intersect the specimen at discrete angles $a$—$x$ and $b$—$x$, one of which angles may be zero.

This results in the appearance of two identical but displaced electron-images 21 and 22 of the specimen 4 upon the fluorescent screens 7 and 12. In accordance with the invention, the frequency of the square-wave oscillator (and hence the rate at which the deflecting electrodes 8—10 and 9, 11 are energized) is sufficiently high to ensure "persistence of vision" and thus to render both of the images 21 and 22 visible at the same time. The focusing operation involves the adjustment of the current (or in the case of an electrostatic lens system, the voltage) of the objective lens 5 to that value for which the two images (21 and 22, Fig. 1) exactly coincide and form a single image (23). Even in the out-of-focus condition the separate images 21 and 22 appear quite clear, and the distance between them is a measure of the amount the instrument is out of focus. The slightest movement of the rheostat or other control element 24 for the objective lens 5 will indicate in which direction it must be adjusted to achieve focus. When the instrument is in focus the oscillator or generator 20 is turned off, whereupon the path of the electrons is determined, as in a conventional electron-microscope, by the beam forming and lens elements.

The square wave oscillator 20 may be of any convenient type. In the instant case it comprises a dual triode 25 which is used as a two-stage "clipper-amplifier," and a cathode-follower circuit which includes a beam tube 26 and cathode resistor 27 which is connected through an on-off switch 28 to the ungrounded beam deflecting electrodes 8—10. Raw 60 cycle alterating current is applied to the input grid of the amplifier 25. The first stage clips the positive portion of the A. C. input and the second stage clips the negative portion. The residual signal is transferred through the plate resistors 29 and 30 to the signal grid of the beam tube 26. The output is taken from the cathode-load impedance 27 which provides a signal voltage of low source-impedance. Three selenium rectifiers 32, 33 and 34 across the A. C. line provide the necessary D. C. for the plate supplies of the clipper amplifier and cathode follower tubes. Appropriate tube types and resistor and capacitor values for this particular form of square-wave oscillator are marked on the drawing.

As previously indicated, the deflecting forces to which the beam is subjected during the focusing operation may be electromagnetic (instead of "electrostatic") in character. In this case, referring now to Fig. 4, the four-electrode assembly of Figs. 1, 2 and 3 may be replaced by two electromagnets 40 and 41, mounted one above the other with the north (N) and south (S) poles of the two magnets on opposite sides of the electron-optical axis $x$—$x$ of the instrument. It will be observed that the energizing coils, 40C and 41C, of these electromagnets are connected in series and that the lower coil 41C has twice the number of turns of the upper coil. The resulting larger number of magnetic lines of force between the pole faces of the lower magnet causes the beam (which has been deflected off the axis $x$—$x$ by the upper magnet) to return toward the said axis at an angle sufficiently great to permit the beam to impinge upon the specimen at an angle other than 90°.

From the foregoing it will be apparent that the present invention provides a novel and facile method of, and improved means for ascertaining and adjusting the focus of electron-optical instruments of the type wherein electrons travel from a source to a specimen and thence to an objective lens-field to a viewing screen.

What is claimed is:

1. Method of ascertaining and adjusting the focus of an electron microscope of the type wherein electrons travel from a source to a specimen and thence through an objective lens-field to a viewing screen, said method comprising: directing said beam upon said specimen at discrete angles alternately and repeatedly at a rate sufficiently rapid to produce upon said viewing screen a plurality of simultaneously-visible discrete images of said specimen, and then varying the strength of said objective lens-field until said plurality of discrete images are brought into register with each other and appear as a single image upon said screen.

2. Method of ascertaining and adjusting the focus of an electron microscope of the type wherein electrons travel from a source through a beam-forming field to a specimen and thence through an objective-lens field to a viewing screen, said method comprising: subjecting the electrons in the space between said beam-forming field and said specimen alternately to discrete deflecting forces of a sign and at a rate calculated to produce two simultaneously visible images of said specimen upon said viewing screen, and then varying the strength of said objective lens-field until said two visible images are brought into register and appear as a single image upon said screen.

3. The invention as set forth in claim 2 and wherein the individual ones of said discrete deflecting forces are applied simultaneously on opposite sides of said beam at spaced points along the path thereof.

4. The invention as set forth in claim 2 and wherein the deflecting forces to which said electrons are subjected during their passage between said beam-forming field and said specimen are electrostatic in character.

5. The invention as set forth in claim 2 and wherein the deflecting forces to which said electrons are subjected during their passage between said beam-forming field and said specimen are magnetic in character.

6. Method of ascertaining and adjusting the focus of an electron microscope of the type wherein electrons travel from a source through a beam-forming magnetic field to a specimen and thence through a magnetic objective-lens to a viewing screen, said method comprising: subjecting the electrons in the space between said beam-forming magnetic field and said specimen alternately to discrete electrostatic fields of a sign and at a rate calculated to produce two simultaneously visible images of said specimen upon said viewing screen, then varying the strength of the magnetic field of said objective lens until said two visible images are brought into register and appear as a single image upon said screen, and finally ceasing the application of said alternately applied electrostatic fields while continuing to subject said electrons to said magnetic beam-forming and objective lens-field.

7. The combination with an electron microscope of the type wherein electrons travel in the form of a beam from a source to a specimen and thence through an adjustable objective lens to a viewing screen, of a plurality of beam-deflecting electrodes mounted in spaced relation between said source and said objective lens, and means for alternately energizing selected ones of said beam deflecting electrodes whereby to direct said beam to said specimen and thence to said viewing screen along discrete paths.

8. The invention as set forth in claim 7 and wherein said energizing means comprises a square-wave oscillator.

JAMES HILLIER.
SIDNEY G. ELLIS.

No references cited.